United States Patent [19]

Ritchie

[11] Patent Number: 5,895,730
[45] Date of Patent: Apr. 20, 1999

[54] HIGH TEMPERATURE BATTERY

[75] Inventor: Andrew Graham Ritchie, Gosport, United Kingdom

[73] Assignee: Secretary of State for Defense, The Defence Evaluation and Research Agency, Hants, United Kingdom

[21] Appl. No.: 08/809,949

[22] PCT Filed: Sep. 11, 1995

[86] PCT No.: PCT/GB95/02140

§ 371 Date: Mar. 26, 1997

§ 102(e) Date: Mar. 26, 1997

[87] PCT Pub. No.: WO96/08845

PCT Pub. Date: Mar. 21, 1996

[30] Foreign Application Priority Data

Sep. 14, 1994 [GB] United Kingdom ............... 9418475

[51] Int. Cl.$^6$ ............................................... H01M 4/36
[52] U.S. Cl. ........................... 429/103; 429/112; 429/199
[58] Field of Search ............................. 429/103, 112, 429/199

[56] References Cited

U.S. PATENT DOCUMENTS

| | | | |
|---|---|---|---|
| 3,506,492 | 4/1970 | Buzzelli et al. | 136/6 |
| 3,677,822 | 7/1972 | Bush | 136/83 T |
| 4,003,753 | 1/1977 | Hall | 429/199 |
| 4,184,015 | 1/1980 | Reau et al. | 429/193 |
| 4,189,529 | 2/1980 | Birt et al. | 429/103 |
| 4,234,667 | 11/1980 | Bennion et al. | 429/81 |

FOREIGN PATENT DOCUMENTS

| | | |
|---|---|---|
| 0206339 | 12/1986 | European Pat. Off. . |
| 0469574 | 2/1992 | European Pat. Off. . |
| 1099465 | 1/1968 | United Kingdom . |
| 1442971 | 7/1976 | United Kingdom . |
| 1482335 | 8/1977 | United Kingdom . |
| 2219430 | 12/1989 | United Kingdom . |

OTHER PUBLICATIONS

Journal of Power Sources, vol. 29, No. 3, Feb. 1, 1990, pp. 321–332.
Extended Abstracts; vol. 86–1, May 4, 1986, pp. 810–811.
Patent Abstracts of Japan, vol. 8, No. 44, Feb. 25, 1984, JP.A.58 201265.

Primary Examiner—Bruce F. Bell
Attorney, Agent, or Firm—Stevens, Davis, Miller & Mosher, L.L.P.

[57] ABSTRACT

An electrolyte system suitable for a molten salt electrolyte high temperature battery is described consisting only of a first component which consists of one or more lithium halides and a second component which consists of one or more lithium compounds which are not lithium halides, and is preferably one or more of lithium sulphate, lithium sulphide, lithium metaborate and lithium oxide. A molten salt electrolyte high temperature battery is described incorporating the electrolyte (2), an anode, preferably of lithium or a lithium alloy (3), and a cathode, preferably of iron disulphide (1).

9 Claims, 1 Drawing Sheet

HIGH TEMPERATURE BATTERY

This application is a 371 of PCT/GB95/02140 filed Sep. 11, 1995.

The present invention relates to high temperature batteries and more particularly relates to electrolyte systems for molten salt electrolyte high temperature batteries.

There are two main types of high temperature electrical batteries which use molten salt electrolytes: thermal batteries and high temperature rechargeable batteries. The thermal batteries are primary (non-rechargeable) batteries and normally generate a single continuous energy output on activation. The duration of the output may vary from a few seconds to about an hour dependent on battery design and construction. Such batteries are particularly suited to short burst high power applications, especially for missiles. The high temperature rechargeable batteries are of interest as power supplies for submarines and electric vehicles. Both primary reserve thermal batteries and high temperature rechargeable batteries use an electrolyte which is an ionically conducting liquid in the high temperature operational state but a non-conducting solid in the storage state. The invention relates to molten salt electrolyte systems suitable for both types of high temperature battery.

Thermal batteries are formed from a series construction of cells having an inert state and a thermally active state. The normal storage state is the inert state when the cell electrolyte between the anode and cathode is in a solid form e.g. at ambient temperature. The thermally active state exists when the electrolyte is molten and this state may be obtained rapidly when required by igniting a charge of a pyrotechnic material in close proximity to the electrolyte. The cell temperature in the thermally active state is typically 350–600° C.

In known modern thermal batteries the anode is usually based on lithium. This may be in the form of a solid electrode of a lithium alloy (with boron, silicon or aluminium) held in a support, such as is described in UK patent 1482335, or as liquid lithium or lithium based mixtures retained in a foraminous metal substrate by capillary action, such as is described in UK patent 1442971. Almost all modern thermal batteries use lithium or its alloys in the anode because of its high electrode potential, its high coulombic capacity due to its low atomic weight and its relatively high chemical stability which facilitates handling. The cathode is a disc of iron sulphide or disulphide.

The electrolyte is in the form of a pressed powder pellet commonly comprising a eutectic mixture of lithium chloride and potassium chloride or of lithium fluoride, lithium chloride and lithium bromide, although other mixtures are known. The electrolyte is incorporated on an inert binder such as magnesium oxide to immobilise it when molten. The advantages of molten salts as battery electrolytes are that they have high conductivity for high currents and power densities, thermal stability, chemical stability towards anodes and cathodes, cheapness and ready availability. However they also have the disadvantage of having high melting points which necessitate high heat input to activate the batteries and may cause thermal management problems.

The thermal input required may be obtained rapidly by ignition of pyrotechnic material, which may be a mixture of iron and potassium perchlorate in the form of a pellet located adjacent to the cell. The cells may be connected in a stack, each cell being separated by a pellet of pyrotechnic material. The stack is typically hermetically sealed within a steel case. The high power density and long maintenance free storage life make thermal batteries well suited to certain military applications.

The term molten salt electrolyte as used in the context of such batteries generally refers to a lithium halide containing salt which is maintained at a temperature above its melting point. The molten salt is commonly either a mixture of lithium halides, or a mixture of one or more lithium halides in combination with other alkali metal or alkaline earth halides. In the latter case, binary eutectic mixtures of lithium halide salts with halide salts of potassium, or occasionally barium and strontium, are preferred. The two principal molten electrolytes that have become established for high temperature batteries are (a) binary lithium chloride-potassium chloride eutectic mixtures of melting point around 352° C. and (b) ternary lithium fluoride-lithium chloride-lithium bromide eutectic mixtures of melting point around 445° C.

Mixtures of salts of lithium and other metals have the advantage of lower melting points than mixtures of lithium halides only, but high currents cannot be passed at temperatures only slightly above the melting point due to resultant lithium concentration changes raising the melting point. The above is particularly marked in the case of the preferred binary eutectics. The effective minimum operating temperature is therefore appreciably above the melting point of the eutectic. This problem does not arise with electrolytes comprising mixtures of lithium halides only, which offer higher conductivities at or near the melting point, but these already exhibit higher melting points and thus also require relatively high heat input to operate the batteries.

The present invention is directed towards an improved molten salt electrolyte system of the lithium halide mixture type that overcomes or alleviates some of the disadvantages of previous systems by providing higher conductivity at lower temperatures than previously.

Thus according to the present invention there is provided an electrolyte system suitable for a molten salt electrolyte high temperature battery, the electrolyte system consisting only of a first and a second component, save for incidental impurities, wherein the first component consists only of one or more lithium halides and the second component consists only of one or more lithium compounds which are not lithium halides, preferably selected from the group comprising lithium sulphate, lithium sulphide, lithium metaborate and lithium oxide.

It has been noted that prior art electrolytes comprising mixtures of lithium salts only tend to exhibit higher conductivities than those which combine salts of lithium and those of other metals. For this reason the first component is restricted to one or more lithium halides only and the second component is also restricted to one or more lithium salts so that all positive carriers within the electrolyte are $Li^+$. The non-halide second component mixes with the first to depress the melting point of the electrolyte relative to that of the lithium halide first component alone. This mitigates the principal disadvantage of this class of molten salt electrolytes: its higher melting temperature than is achievable with the better electrolytes of the class consisting of mixtures of salts of lithium and those of other metals. It is found that this property can be achieved in electrolytes according to the invention without the significant lowering of the conductivity which can be associated with electrolytes in which salts of several alkali metals are mixed. This effect may be attributable to the fact that the second component contributes only $Li^+$ to the electrolyte mixture so that the mixture comprises a single positive carrier. Save for incidental impurities, the electrolyte composition of the present invention is made up of only these two components.

It will be appreciated that choice of second component is subject to the inherent restriction that it must form a stable mixture at the operating temperature without thermal decomposition or reaction with the lithium halides of the first component, but such restriction can be readily made with reference to general knowledge of the properties of lithium compounds. Subject to that proviso the novel approach to electrolyte formulation embodied by the present invention encompasses all electrolyte mixtures where a non-halide lithium second component is added to a lithium halide first component, thereby lowering the melting point of the electrolyte below that of the first component alone. Mixtures of lithium halides with lithium sulphate, lithium sulphide, lithium metaborate and lithium oxide are particularly preferred.

Although GB patent 1442971 advocates the addition of sulphide at saturation levels to electrolytes of the type comprising a mixture of lithium halides in combination with other alkali metal halides, this is for the purpose of stabilising the metal sulphide cathode by minimising leaching of sulphide therefrom during operation. It is not suggested that melting point can thereby be lowered; nor would the lowering of the melting point be of such importance in this class of electrolytes where the operational problem is the limited current density available near the melting point rather than the melting point itself In the case of the present invention however, addition of the second component to a first component consisting solely of lithium halide salts results in an electrolyte with the higher conductivity characteristic of lithium halide only electrolytes, but with the advantages of lower melting point conventionally found in electrolytes which combine lithium halides with other alkali metal halides.

The first component (mixture) is preferably a eutectic mixture and is most preferably a ternary eutectic mixture. A preferred ternary mixture comprises lithium chloride, lithium bromide and lithium fluoride. The first and second components together are preferably mixed substantially to the eutectic composition. A preferred electrolyte system consists essentially of, except for incidental impurities, at least 60% by weight of ternary eutectic mixture and the balance of up to 40% by weight of lithium sulphate, and is more preferably a eutectic mixture of about 70% by weight of ternary eutectic mixture and the balance of 30% by weight lithium sulphate.

The invention also includes a high temperature battery for operation with a molten salt electrolyte comprising an anode, a cathode and an electrolyte system as hereinbefore described.

The electrolyte system may be used with both primary and secondary high temperature batteries. The anode preferably comprises lithium or a lithium alloy. The cathode material preferably comprises iron disulphide, iron sulphide or a mixture thereof. Iron disulphide is generally favoured for thermal batteries, but iron sulphide may be preferred in high temperature rechargeable batteries.

BRIEF DESCRIPTION OF THE DRAWING

The invention will now be described by way of example only with reference to the accompanying FIGURE.

Figure 1:
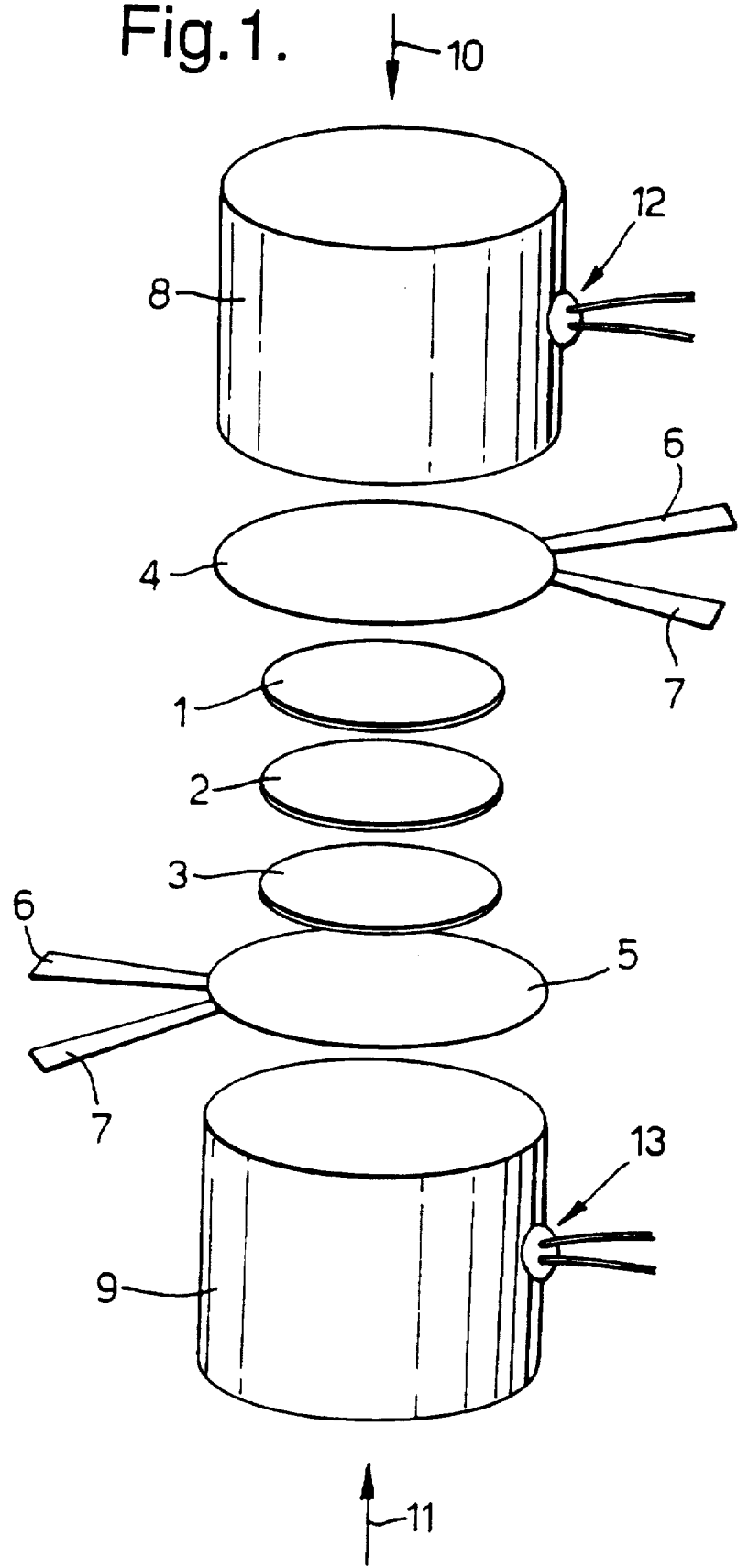
FIG. 1 is an arrangement of an electrochemical cell or battery having cathode, electrolyte and anode pellets.

An electrolyte system was formed comprising about 70wt % eutectic of lithium chloride, lithium bromide, lithium fluoride and 30 wt % lithium sulphate. The electrolyte system was immobilised on magnesium oxide which acts as a binder to keep the molten eutectic in place during the tests. The components of the eutectic mixture are mixed, fused together and ground into a fine powder prior to incorporation with the binder. The electrolyte was pressed into pellet form.

The cathode is in the form of a pressed pellet of iron disulphide.

The anode was formed by pressing a powdered lithium aluminium alloy (20 wt % Li 80 wt % Al) into pellets of similar dimensions to the cathode pellets. The pellets were pressed in a dry air environment as the ternary eutectic is very hygroscopic.

The cathode, electrolyte and anode pellets were then arranged in an inert atmosphere of argon to provide an electrochemical cell or battery as shown in FIG. 1.

The cathode, electrolyte and anode pellets are indicated by reference numerals 1, 2, and 3 respectively. Iron current collecting discs 4 and 5 are shown placed respectively above and below the pellet array 1,2,3. The discs 4,5 are made of iron and each has a current output lead 6 and a voltage output lead 7. The discs 4 and 5 with the pellets 1, 2, and 3 between them are pressed between boron nitride platens 8, 9 respectively by pneumatic rams 10, 11 at a pressure of about 3 kg cm$^{-2}$. The platens 8, 9 are heated by electrical cartridge heaters 12, 13 respectively.

The boron nitride platens were heated to the chosen temperature and then the hydraulic rams were operated to clamp the cell firmly together. Heat rapidly diffused from the platens into the cell with resulting melting of the electrolyte and activation of the cell.

The melting ranges of mixtures of the ternary eutectic of lithium fluoride-lithium chloride-lithium bromide with lithium sulphate were measured by the technique of differential thermal analysis. The results are shown in Table 1.

As the table illustrates, the 70:30 ternary:lithium sulphate mixture is to be preferred as the melting range is the narrowest.

TABLE 1

The melting ranges of mixtures of the ternary eutectic of lithium fluoride - lithium chloride - lithium bromide with lithium sulphate

| TERNARY (weight %) | LITHIUM SULPHATE (weight %) | MELTING RANGE (°C.) |
|---|---|---|
| 100 | 0 | 441–467 |
| 90 | 10 | 397–465 |
| 80 | 20 | 400–447 |
| 70 | 30 | 399–435 |
| 60 | 40 | 401–469 |

The ternary/lithium sulphate eutectic was prepared by fusing together 7.00 g ternary eutectic with 3.00 g lithium sulphate (previously dried at 200° C. under vacuum) at 500° C., then cooling the melt, storing it in a dry air glove box and grinding it and sieving to below 212 μm. The ternary/sulphate electrolyte was prepared by fusing together 4.51 g ternary/sulphate eutectic with 6.68 g magnesium oxide (to act as binder) at 500° C., cooling it, storing it in a dry air glove box, grinding it and sieving it to below 212 μm.

Discharge capacities (in Coulombs per gram of iron disulphide to a cell voltage of 1.5 V) were measured using both the known ternary electrolyte and the new ternary/sulphate electrolyte with the results shown in Table 2. These results demonstrate that, using the new ternary/sulphate electrolyte, it is possible to discharge cells at 410° C. which is not possible with the existing ternary electrolyte and that significantly longer discharges are obtained in most cases and particularly at the higher current densities than with the existing electrolyte.

TABLE 2

Discharge capacities for known ternary electrolyte and new ternary plus sulphate electrolyte

| TEMPERATURE (° C.) | CURRENT DENSITY (mA/cm²) | DISCHARGE CAPACITY (C/g FeS₂ to 1.5 V) | |
|---|---|---|---|
| | | TERNARY ELECTROLYTE | TERNARY/SULPHATE ELECTROLYTE |
| 410 | 0.1 | 0 | 624 |
| | 0.25 | 0 | 213 |
| | 0.5 | 0 | 247 |
| | 1.0 | 0 | 0 |
| 460 | 0.1 | 371 | 763 |
| | 0.25 | 188 | 641 |
| | 0.5 | 142 | 543 |
| | 1.0 | 0 | 420 |
| 500 | 0.1 | 849 | 848 |
| | 0.25 | 555 | 794 |
| | 0.5 | 424 | 587 |
| | 1.0 | 121 | 459 |
| 530 | 0.1 | 825 | 857 |
| | 0.25 | 670 | 660 |
| | 0.5 | 371 | 651 |
| | 1.0 | 110 | 468 |
| 580 | 0.1 | 735 | 658 |
| | 0.25 | 719 | 700 |
| | 0.5 | 605 | 795 |
| | 1.0 | 428 | 642 |

I claim:

1. A molten salt electrolyte system suitable for a molten salt electrolyte high temperature battery, the electrolyte system consisting only of a first and a second component, save for incidental impurities, wherein the first component consists only of a ternery eutectic mixture of lithium halides and the second component consists of lithium sulphate, wherein the melting point of the electrolyte system is depressed relative to the melting point of the first component alone and conductivity of the system at or near the melting point is not significantly lowered.

2. A system according to claim 1, the system comprising at least 60% by weight of the first component and the balance of up to 40% by weight of the second component.

3. An electrolyte system in accordance with claim 2, comprising about 70% by weight of the first component and about 30% by weight of the second component.

4. An electrolyte system in accordance with claim 1, comprising about 70% by weight of the first component and about 30% by weight of the second component.

5. An electrolyte system according to claim 1, wherein the ternery eutectic mixture comprises lithium chloride, lithium bromide and lithium fluoride.

6. A high temperature battery for operation with a molten salt electrolyte comprising an anode, a cathode and an electrolyte system in accordance with claim 1.

7. A high temperature battery according to claim 6, wherein the anode comprises lithium or a lithium alloy.

8. A high temperature battery according to claim 6, wherein the cathode material is selected from the group consisting of iron disulphide, iron sulphide and mixtures thereof.

9. A high temperature battery according to claim 8, wherein the cathode material is selected from the group consisting of iron disulphide, iron sulphide and mixtures thereof.

* * * * *